United States Patent
Slagter (10) Patent No.: US 6,569,923 B1
(45) Date of Patent: May 27, 2003

(54) POLYMER-CEMENT COMPOSITES AND METHODS OF MAKING SAME

(76) Inventor: John T. Slagter, 3079 Vistabrook Ave. SE., Kentwood, MI (US) 49512-5617

(*) Notice: Subject to any disclaimer, the term of this patent is extended or adjusted under 35 U.S.C. 154(b) by 0 days.

(21) Appl. No.: 09/528,336

(22) Filed: Mar. 17, 2000

Related U.S. Application Data
(60) Provisional application No. 60/125,327, filed on Mar. 19, 1999.

(51) Int. Cl.$^7$ .............................................. C04B 16/04
(52) U.S. Cl. ......................... 524/5; 106/696; 106/724; 106/737; 428/446; 428/500; 428/688
(58) Field of Search .............................. 524/5; 106/696, 106/724, 737; 428/446, 500, 688

(56) References Cited

U.S. PATENT DOCUMENTS

| | | | |
|---|---|---|---|
| 4,849,018 A | 7/1989 | Babcock et al. | 106/104 |
| 4,861,822 A | 8/1989 | Keskey et al. | 524/559 |
| 4,880,467 A | 11/1989 | Rirsch et al. | 106/85 |
| 5,075,358 A | 12/1991 | Riley et al. | 524/5 |
| 5,185,389 A | 2/1993 | Victor | 524/2 |
| 5,192,366 A | 3/1993 | Nishioka et al. | 106/724 |
| 5,268,028 A | 12/1993 | Fifield | 106/726 |
| 5,269,845 A * | 12/1993 | Granau et al. | 106/696 |
| 5,332,774 A | 7/1994 | Klang et al. | 524/377 |
| 5,362,320 A * | 11/1994 | Whatcott | 106/724 |
| 5,366,550 A | 11/1994 | Schad | 106/730 |
| 5,476,343 A * | 12/1995 | Sumner | 106/696 |
| 5,496,404 A | 3/1996 | Price et al. | 106/407 |
| 5,565,027 A | 10/1996 | Shawl et al. | 106/802 |
| 5,594,050 A | 1/1997 | Audebert et al. | 524/5 |
| 5,603,758 A | 2/1997 | Schreifels et al. | 106/677 |
| 5,688,844 A | 11/1997 | Chatterji et al. | 524/8 |
| 5,795,924 A | 8/1998 | Chatterji et al. | 523/130 |
| 5,891,374 A | 4/1999 | Shah et al. | 264/108 |

FOREIGN PATENT DOCUMENTS

| | | | |
|---|---|---|---|
| DE | 27 49 432 | 5/1978 | C04B/15/02 |
| EP | 0 069 586 | 1/1983 | C04B/24/24 |
| EP | 0 173 553 | 3/1986 | B28B/1/29 |
| GB | 2 192 392 | 1/1988 | C04B/40/02 |
| WO | 89/01918 | 3/1989 | C04B/28/04 |
| WO | 94/24062 | 10/1994 | C04B/28/04 |

OTHER PUBLICATIONS

Ramakrishnan, *National Cooperative Highway Research Program Synthesis of Highway Practice 179: Latex Modified Concretes and Mortars*, Transportation Research Board, National Research Council (Washington: 1992).

* cited by examiner

*Primary Examiner*—Margaret Medley
(74) *Attorney, Agent, or Firm*—Rohm & Monsanto, PLC (57) ABSTRACT

A polymer-cement composite comprises, by weight percent, about 40% to 50% inert, inorganic filler material, such as silica sand; about 12% to 23% latex, preferably in aqueous suspension; about 20% to 25% hydraulic cement; and about 7% to 13% reactive silica. The reactive silica is a pozzolanic material, and in preferred embodiments, where the cement is portland cement, comprises an advantageous mixture of precipitated and ground silica. All solid components have a particle size of less than about 300 microns. The polymer-cement composite is preferably made by dry mixing of the powdered components throughly in a high intensity mixer, adding the liquid components, and wet mixing to form a thoroughly blended, de-aired green mixture. The green mixture is formed into any desired shape, cured, and dried. Preferably, the product is cured in a warm, moist environment.

47 Claims, 4 Drawing Sheets

POLYMER-CEMENT COMPOSITES AND METHODS OF MAKING SAME

This application claims the benefit of Provisional Application No. 60/125,137, filed Mar. 19, 1999.

BACKGROUND OF THE INVENTION

1. Field of the Invention

This invention relates generally to polymer-cement composites, and more particularly to polymer-cement composites having both cementitious and polymer bonding and products made from the cured polymer-cement composites.

2. Description of the Related Art

Portland cement comprises, essentially, a heterogeneous mixture of calcium silicate and calcium aluminate phases that hydrate simultaneously. The calcium silicate phases make up about 75% by weight of the cement and are responsible for most of the strength development. The products of hydration are calcium-silicate-hydride (C-S-H), the cementitious binding phase, and calcium hydroxide. The C-S-H is present as a continuous, poorly crystallized, rigid gel phase, and the calcium hydroxide forms large, equiaxed crystals predominantly in large pores and capillaries. The presence of calcium hydroxide in the large pores and capillaries tends to make the cement susceptible to acid and sulfate attack. Calcium hydroxide can be leached to the surface where it carbonates to form discoloring deposits (efflorescence). The leaching increases the porosity, making the material more susceptible to infiltration and attack. Also, the presence of relatively weak calcium hydroxide crystals in the pores prevents filling of the pores with stronger C-S-H, causing a reduction in the attainable strength.

Cementitious products formed with binding phases from only cement and water typically have low strengths and are brittle, i.e., have low flexibility. A commonly used way to increase strength, by reducing porosity in cements, mortars, and concretes, is to reduce the water content, commonly reported as the water-to-cement ratio (w/c). Lowering the batch w/c ratio has a tendency to reduce the cured porosity by reducing the open pore space vacated by evaporation of excess water.

The addition of a colloidal suspension of polymer solids in water, commonly referred to as latex, to the batch improves workability and usually allows a reduction in the w/c ratio. Tile improvement in workability is attributed to the spherical latex particles (that act like microscopic ball bearings) and to the surfactants that are typically added to help stabilize the suspension. Thus, adequate plasticity, or flow, is attained for lower water contents. Cured product containing latex must be dried to form a continuous polymer film that coats the open surfaces of the solid particles, cementitious matrix, pores and capillaries. This continuous coating of dried latex increases the strength, flexibility, wear resistance, impact resistance, and chemical resistance relative to cement. Latex additions to a batch also improve the adhesion or bonding to other materials.

However, prior art compositions typically have used high latex additions (a volume fraction of latex solids to cement (ls/c) between 0.4 and 0.7 or higher). This resulted in very long cement curing times and a detrimental level of water susceptibility (permeability). There is, therefore, a need in the art for an improved latex-cement or polymer-cement composition having normal or accelerated setting times, and low permeability. In addition to the foregoing, cement and latex-cement are not very flexible. It would additionally be advantageous to be able to adjust such characteristics as strength, flexibility and durability in a polymer-cement composite.

In addition to the foregoing, the methods that can be employed to form known cement or latex-cement compositions are limited due to the high viscosity of the green (uncured) body. There is, therefore, a need in the art for an improved polymer-cement composition wherein the viscosity of the uncured batch can be adjusted to accommodate almost any forming method.

It is an object of this invention to provide a polymer-cement composite wherein unique combinations of strength, flexibility and durability, can be effected by both composition and curing procedures.

It is a further object of the invention to provide polymer-cement composite which can be made by most conventional forming methods.

It is another object of the invention to provide a polymer-cement composite such that products can be formed from the composite without the use of water-soluble polymers, thereby greatly reducing the susceptibility of the products to water-based attack or degradation.

It is still a further object of the invention to provide a polymer-cement composite for forming products wherein the flexibility of the products can be adjusted to facilitate installation methods, unlike rigid or brittle construction materials.

SUMMARY OF THE INVENTION

The foregoing and other objects, features and advantages are achieved by this invention which is a polymer-cement composite in which the physical properties of the composite are determined by the combined effects of two distinct binding phases, cementitious and polymer (latex). The composite of the present invention basically comprises an inert, inorganic filler material, such as sand, latex, cement, reactive silica, and water. In preferred embodiments, the reactive silica is pozzolanic. Conventional additives, such as pigments and admixtures, are optional components. In preferred embodiments, all solid material components have particle sizes less than 300 microns.

In particularly preferred embodiments, the composite comprises, by weight percent, about 40% to 50% inert, inorganic filler material; about 12% to 23% latex; about 20% to 25% cement; and about 7% to 13% reactive silica.

The term "pozzolanic" refers to materials which contain high amounts of silica ($SiO_2$) that are of sufficient reactivity to react at room temperature, in the presence of water, with calcia (CaO) or calcium hydroxide ($Ca(OH)_2$) in the cement to form C-S-H. Calcium hydroxide is produced, for example, by hydrating portland cement. Pozzolan additions in hydrating calcium aluminate cements typically react to form stratlingite (hydrated gehlenite, a calcium aluminate silicate hydrate), resulting in better strength retention with time than in products not containing pozzoians.

The addition of a sufficient quantity of pozzolanic material to the batch significantly reduces porosity and permeability in the cured product, and increases long term strength. Pozzolanic reactions are slower than those of the cement components, but they react with the calcium hydroxide and deposit C-S-H into the large pores and capillaries. This can result in filling of the open capillaries and large pores, greatly reducing permeability. Filling of large pores with strong reaction product instead of relatively weak calcium hydroxide results in increased strength of the product. Reduction in the amount of calcium hydroxide that can be leached to the surface reduces the tendency to effloresce. The setting time of the composite of the present invention is normal or accelerated.

As used herein, the term "sand" means essentially inert, inorganic filler materials having particle sizes ranging from about 50 to 300 microns. These fillers include, but are not limited to, materials such as silica sand, ground nepheline syenite, ground sandstone, ground limestone, ground dolomite, coarse fly ash, and ground basalt. Lightweight, fine aggregate materials such as fly ash, perlite, and vermiculite, may be used in applications where product densities must be minimized. In preferred embodiments, the inorganic filler is silica sand.

The term "latex" means a colloidal suspension of polymer solids in water. A latex typically contains about 50 percent by weight of spherical polymer particles ranging in size from about 0.01 micron to 1 micron in diameter. The preferred latexes are those most commonly used in latex-modified concretes. These include well-known elastomeric (rubber-like), thermoplastic polymers. In specific preferred embodiments, the polymer may be, but is not limited to, polyacrylate, styrene-butadiene, or styrene-acrylate. Of course, other latex polymers, known and used by those of ordinary skill in the art, such as the alkali-swellable latexes described in U.S. Pat. Nos. 4,861,822 and 5,047,463, are within the contemplation of the present invention.

The latex polymers may be used in either dehydrated form (redispersible latex) or in suspension. "Redispersible latex" means a latex that has been dehydrated and that contains additives that enable redispersion into a water-containing mixture. Use of redispersible latex in compositions containing high amounts of latex enables lower water contents than normally attainable with latex suspensions. In preferred embodiments, however, the latex is in an aqueous suspension. In an aqueous suspension, it is preferred that the latex solids are about 56–58 wt % of the suspension. In specific preferred embodiments, the latex is an aqueous polyacrylate polymer suspension or an aqueous suspension of styrene-acrylate or styrene-butadiene. Although viscosity of the green body is controlled by water content, water-soluble polymers in suspension can be used to further modify viscosity.

The term "cement" refers, in this invention, preferably to hydraulic cements. Hydraulic cements harden by reacting with water to form a water-resistant product that can serve to bind other materials. Most hydraulic cements usually range in particle size from about 1 to 100 microns, with median particle sizes in the 10 to 15 micron range. The most commonly used hydraulic cements are portland cement and calcium aluminate cements. For this invention, portland cement is preferred.

The term "reactive silica" refers, in specifically preferred embodiments, to pozzolanic materials, and particularly to pozzolanic materials having particle sizes fine enough to make them readily react in a hydrating, predominately calcium silicate-based (e.g., portland cement), cementitious environment. These reactive silica materials range in average particle size from about 0.01 to 45 microns. These materials include, without limitation, one or more of the following: ground silica, silica fume (microsilica), precipitated silica, fly ash, and ground blast furnace slag.

Table 1 sets forth material components, including the average particle size of the components, for preferred embodiments of the composite aspect of the present invention:

TABLE 1

| | Material | Avg. Particle Size | Range of Addition |
|---|---|---|---|
| 1 | Sand | 130 μm | 40–50 wt % |
| 2 | Latex | 0.2 μm | 12–23 wt % |
| 3 | Cement | 10–15 μm | 20–25 wt % |
| 4 | Reactive Silica | ≤3.7 μm | 7–13 wt % |
| 5 | Water | — | 0–5 wt % |

In the formulations of Table 1, sand is used as a non-reactive, coarse filler. Its rounded shape aids flow and workability to the uncured mixture. Latex, and preferably latex solid, functions as a plasticizer in the green state. When fully cured, the latex solids form a continuous film that improves strength, flexibility, durability, weathering resistance, and chemical resistance. Cement, when fully cured, forms a continuous binding phase that imparts strength and rigidity to the product. Reactive silica (ground and/or precipitated) is the pozzolanic material that forms a fine reactive phase that combines with calcium ions produced by the hydration of cement to form a more cementitious phase. This serves to improve strength and reduce permeability. With adequate additions of reactive silica, the molar calcia-to-silica ratio can be lowered sufficiently to minimize or eliminate efflorescence (the reactive silica reacts with essentially all of the calcium hydroxide produced by the hydrating cement). Reactive silica additions usually improve particle packing (space filling) in the uncured batch, leading to higher densities and strengths.

In particularly preferred compositions, the ratios of the various components are constrained as set forth in Table 2.

TABLE 2

| | Components | Ratio |
|---|---|---|
| 1 | Water/cement | 0.43–0.49 by weight |
| 2 | Water/(cement + pozzolan) | 0.30–0.34 by weight |
| 3 | Latex solids/cement | 0.30–0.60 by weight |
| 4 | Sand/cement | 1.90–2.10 by weight |
| 5 | Pozzolan/cement | 0.28–0.61 by weight |
| 6 | Calcia/total reactive silica | 0.80–1.30 by moles |

In some embodiments, strength of the composite may be enhanced by the incorporation of discrete or continuous fibers, or by structural reinforcement with steel cloth, mesh, or rod, in any manner known to a person of ordinary skill in the art.

In a method aspect of the present invention, the polymer-cement composite is made by dry mixing of the powdered components, wet mixing of the batch after addition of the liquids, forming of the product into the desired shape, curing, and drying. In preferred embodiments, all the dry ingredients, including any pigments, are thoroughly mixed in a high intensity mixer until completely homogeneous. The required liquids are added under vacuum, and the complete batch is thoroughly mixed at medium intensity and de-aired. The forming procedure used depends on the type of product being manufactured. For flat products such as tiles, sheets are vacuum extruded from the mixed batch, cut to size, placed into molds, pressed to shape, and de-molded. Due to the excellent rheology of the green body of the composite of the present invention, however, forming can be done by any means known to a person of ordinary skill in the art, such as extrusion, molding, pressing, vibratory casting, or centrifugal casting (to produce pipes).

The formed composite is preferably cured in a moist environment. Two preferred methods for curing the product are (1) high pressure, saturated steam curing in an autoclave, and (2) warm, moist curing. The particular method chosen depends upon the properties desired for the cured product. Preferably, a room temperature moist pre-cure (from about 85% to 95% relative humidity) for up to 1 day precedes either of the aforementioned curing methods.

In specific embodiments of the present invention, autoclaving is done for about 2 to 12 hours at temperatures from about 125° to 180° C. Heating should be done slowly, at a maximum rate of about 60° C. to 80° C. per hour. In moist cure embodiments, the relative humidity should range from about 85% to 95% at a temperature of about 45° C. to 55° C. for about 6 to 14 days. The exact times, temperatures, and pressures may be tailored to the particular composition to achieve the desired properties.

In a particularly preferred specific embodiment, the method of drying the product has two stages. In the first stage, the product is heated to about 85° C. at a rate of about 15° C. per hour and held at temperature for about 16 to 24 hours. This removes almost all the water to avoid entrapped steam damage during final drying. In the second stage, the temperature is increased to about 105° C., at a rate of about 15° C. per hour, and held for about 24 hours.

Illustrative cured products include, without limitation, construction products, such as indoor and outdoor floor tiles, roofing shingles and tiles, residential and commercial exterior siding, small diameter pressure pipe for residential use, and interior ceiling, wall, and floor panels. Many different shapes and sizes of products can be produced due to the great flexibility in forming processes afforded by the excellent rheology of the green (uncured) body. In accordance with the principles of the invention, the construction products can be tailored to have properties from among the following: very low porosities, high flexibility, toughness, abrasion resistance, impact resistance, chemical resistance, durability, and weather resistance.

The cured materials of the present invention have good strength, with flexural strengths typically in the range of 1800–2500 psi. The materials also have excellent flexibility, deflecting 0.5–1.0 in. on a 4.5 in. span before failing. Good strength and flexibility result in a material with a high degree of toughness.

The material can be easily and safely cut with a standard tile saw. The composition can be tailored to produce products that can be nailed in place. Warping of the product does not occur if the product is cured on a flat surface and the rate of drying of the top and bottom surfaces are the same. For colored materials, the pigments are added to the material batch, resulting in a constant color throughout the cross-section of the product.

BRIEF DESCRIPTION OF THE DRAWING

Comprehension of the invention is facilitated by reading the following detailed description in conjunction with the annexed drawing, in which.

DETAILED DESCRIPTION OF THE INVENTION

Composition

In a specific illustrative embodiment of the invention, the typical ranges of addition and particle sizes for the preferred material components of this invention are set forth in Table 3.

TABLE 3

| | Material | Avg. Particle Size | Range of Addition |
|---|---|---|---|
| 1 | Silica Sand | 130 μm | 41–48 wt % |
| 2 | Latex: Suspension | — | 13–22 wt % |
|   | (Solids) | 0.2 μm | (7–13 wt %) |
| 3 | Portland Cement | 10–15 μm | 20–25 wt % |
| 4 | Ground Silica | 3.7 μm | 5–12 wt % |
| 5 | Precipitated Silica | 0.015 μm | 1–2 wt % |
| 6 | Pigments | 0.1–1.0 μm | 0–1 wt % |
| 7 | Admixtures | — | 0–2 wt % |
| 8 | Water | — | 0–5 wt % |

Referring to Table 3, the preferred components are silica sand, latex, portland cement, ground silica, precipitated silica, pigments, admixtures, and water. All of these ingredients are readily available through sources well-known to a person of skill in the art. We have found that using a mixture of precipitated silica and ground silica strikes a balance between reactivity, cost, and rheology. Precipitated silica is much finer than ground silica, which means that it has a very high surface area and is consequently more reactive. Unfortunately, it is also very expensive. Large additions of precipitated silica can increase the amount of water required. Ground silica is also very reactive, but has a minimal effect on the water required for formulations in the composition ranges used in the present invention.

The preferred latex is an aqueous suspension of polyacrylate polymer or copolymers, such as styrene-acrylate and styrene-butadiene. The colloidal nature of precipitated silica has a plasticizing effect in the batch and can be used to eliminate the need for expensive, organic, water-soluble, polymers (admixtures). Water-soluble polymers are admixtures that are universally used to facilitate most pressure-forming methods. Their use is generally considered to increase the susceptibility of a product to water-borne attack. Most admixtures are water-based and serve to help control cement hydration or uncured batch rheology. The primary admixture used in this invention, however, is a high range water reducer (superplasticizer). The purpose of the superplasticizer, which may be commercially available salts of sulphonated napthalene formaldehyde polymers and salts of sulphonated melamine formaldehyde polymers, is to improve workability. Water, a lubricant and plasticizer, is absolutely necessary to form a stiff, workable, green body. The pigments affect no physical properties other than color, although high surface area colorants may increase the amount of water required. In these embodiments, water is supplied mostly by the latex suspension.

Processing of Material and Products

In accordance with the present invention, the dry ingredients, including any pigments, are thoroughly mixed in a high intensity mixer until completely homogeneous, The required liquids are added under vacuum, and the complete batch is thoroughly mixed at medium intensity and de-aired. The resulting green body is formed into the desired shape, and then cured.

Two general methods have been used to cure the formed product: high pressure saturated steam cure (autoclave), and a warm, moist cure. Preferably, a room temperature moist pre-cure (from about 85 to 95% relative humidity) for up to 1 day precedes curing. Autoclaving is done for about 2 to 12 hours at temperatures ranging from about 125" to 180° C. Heating should be done slowly, at a maximum rate of about 60° to 80° C. per hour. The moist cure (from about 85 to 95% relative humidity) is done at 45° to 55° C. for about 6 to 14 days. The exact times, temperatures, and pressures need to be tailored to the particular composition and the desired properties.

The product is dried in two stages. The first stage involves heating the product to about 85° C. at a rate of about 15° C. per hour and holding it at that temperature for about 16 to 24 hours. This removes almost all the water to avoid entrapped steam damage during final drying. The temperature is increased to about 105° C., at a rate of about 15° C. per hour, and held for about 24 hours.

Material Properties

Table 4 shows typical property data for cured polymer-cement composites of the type described in Table 3. Data are also shown for a known PVA fiber-reinforced cement composite for comparative purposes.

TABLE 4

| Sample | MOR (psi) | Maximum Deflection 4.5 in. Span (in.) | Toughness (in-lb/in$^2$) | Taber Abrasion Index | Water Absorption (wt % Gain in 48 h) |
|---|---|---|---|---|---|
| Latex-Cement Composite | 1800–3350 | 0.35–1.0 | 225–1125 | 175–270 | 1.5–2.0 |
| PVA Fiber-Cement Composite | 3430 | 0.07 | 16 | 74 | 4.1 |

Figure 1:
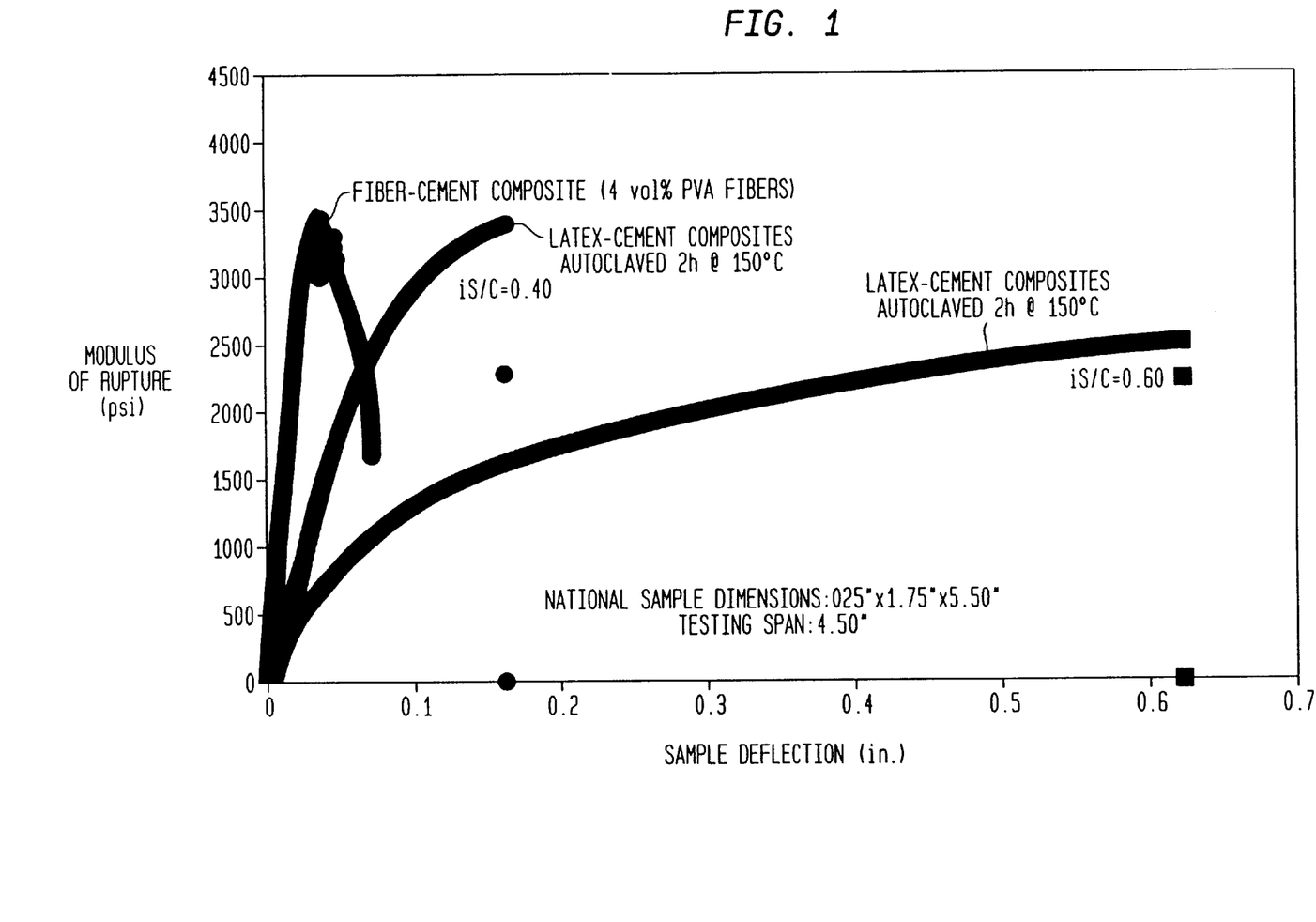
FIG. 1 is a graphical representation of the modulus of rupture (psi) as a function of sample deflection in inches for samples of the polymer-cement composite of the present invention as compared to a PVA fiber-cement composite.

Referring to Table 4, the polymer-cement composites of the present invention have comparable strength, considerably higher flexibility and toughness, and much lower water absorption than the PVA fiber-reinforced cement. Reasonable strengths (1800–3350 psi) are obtained for the polymer-cement samples with moderate to very high flexibility (0.35 in.–1.0 in. deflection on a 4.5 in. test span). This can be seen graphically in FIG. 1 which is a representation of the modulus of rupture (MOR in psi) as a function of sample deflection in inches for samples of the polymer-cement composite of the present invention as compared to a PVA fiber-reinforced cement composite having dimensions of 0.25"×1.75"×5.50". The flexibility and toughness (area under curve) of the polymer-cement composites are considerably greater than the fiber-cement composite. These values of strengths and flexibility produce good to excellent toughness values (225–1125 in.-lb./in.$^2$). The moderate to high flexibility probably helps achieve good abrasion resistance (Taber Abrasion Index of 175–270). This compares favorably with an Index of 300 obtained for a high-fired ceramic. Very low water absorption (1.5–2.0 wt % gain in 48 hours) was obtained, serving as a good indicator of freeze-thaw resistance and negligible efflorescence.

Figure 2:
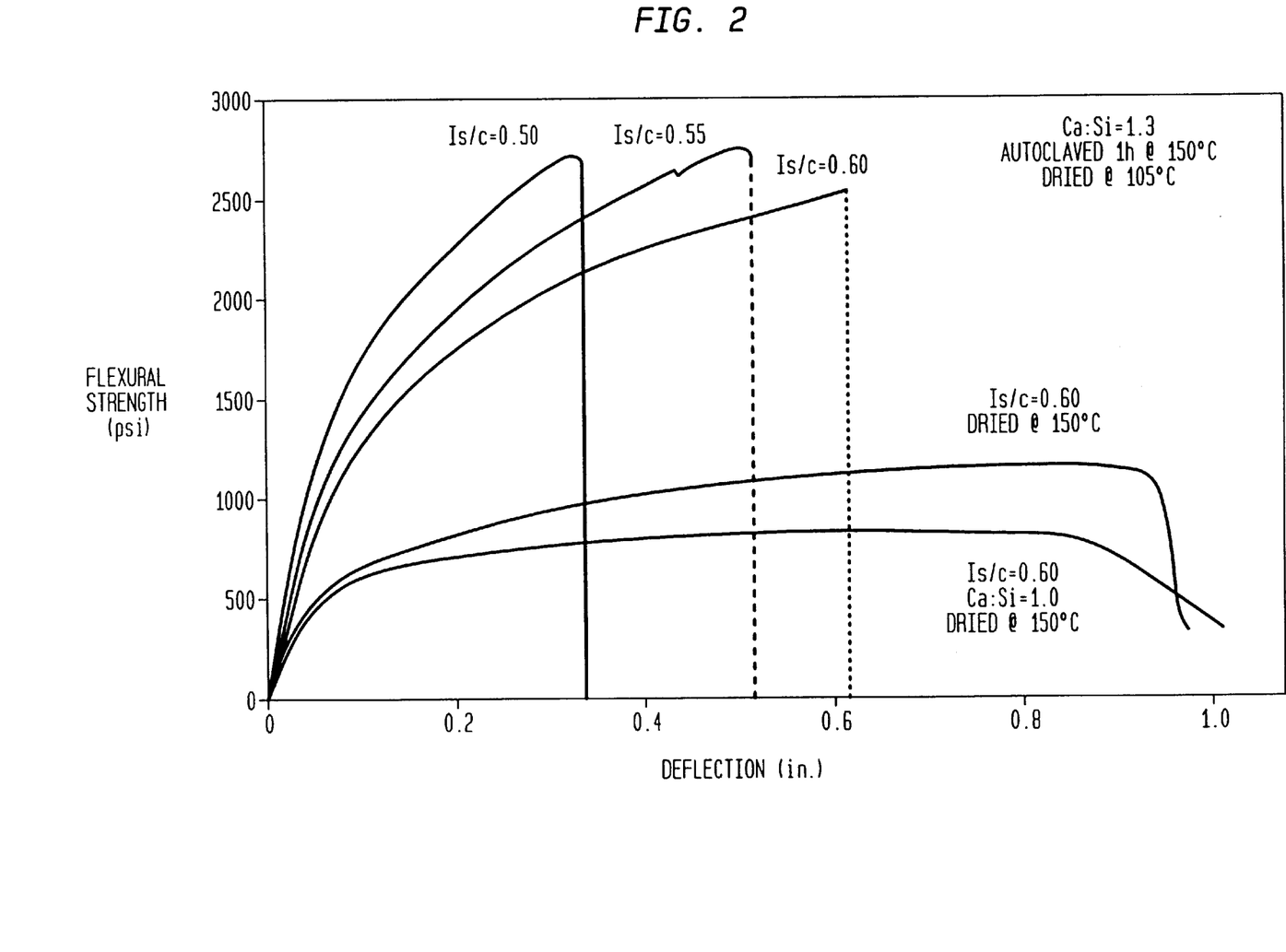
FIG. 2 is a graphical representation of flexural strength (psi) versus deflection (in.) for samples of the polymer-cement composite of the present invention which differ from each other by composition and curing parameters.

Properties such as the strength, flexibility, and durability are determined primarily by the dominant matrix phase in the cured polymer-cement material, and change considerably with both composition and curing conditions. This is illustrated graphically in FIG. 2 which shows flexural strength versus deflection for products varied by composition and curing. A wide range of strengths, flexibilities, and durabilities, as indicated by toughness calculated from the area under the curve, are evident. Probably the most useful aspect of this invention is the ability to tailor a wide range of product properties through adjustments to the curing and drying schedules. Desired effects brought about by changes in composition can be amplified or adjusted by modifications to the curing and drying procedures. For example, procedures that allow extensive development of the cementitious matrix before drying result in stronger, stiffer products. Minimal development of the cementitious matrix before drying results in weaker, but very flexible products.

The cured material is a composite with both the cementitious and latex matrices interlaced, and the properties of the material are a complex composite of the individual contributions of each matrix. The effect that a particular matrix has on the physical properties depends directly on both the quantity and degree of distribution of the matrix phase. A finely distributed matrix imparts its properties more effectively in the cured product than a coarsely distributed one. The latex composition is fixed, but the cementitious composition range, in part due to the calcia-reactive silica ratio of the batch. The crystallinity ranges from amorphous, when cured at ambient temperatures to highly crystalline when autoclaved.

Figure 3:
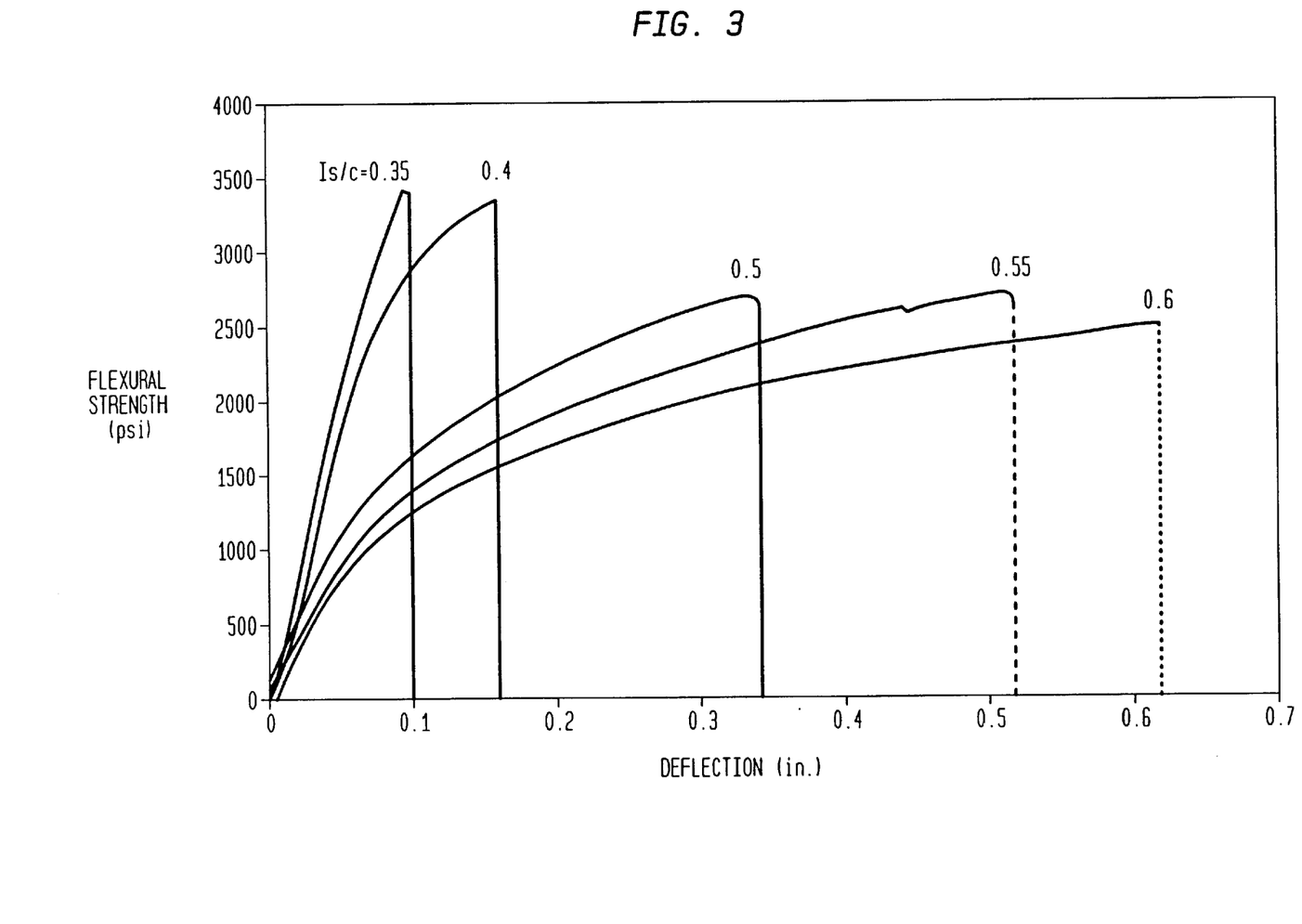
FIG. 3 is a graphical representation of the flexural strength (psi) versus deflection (in.) of samples of the polymer-cement composition of the present invention as a function of volume fraction of latex solids to cement (ls/c)

One relatively clear-cut composition-property relationship is the effect of the volume ratio of latex solids to cement. This can be seen in FIG. 3 which is a graphical representation of the flexural strength (psi) versus deflection (in.) of samples of the polymer-cement composition of the present invention as a function of volume fraction of latex solids to cement (ls/c). Referring to FIG. 3, a direct relationship between the flexibility, or deflection, and the ls/c ratio is shown for samples of composite having ls/c ratios ranging from 0.35 to 0.6. This relationship also applies to the toughness (calculated from the area under the strength-deflection curve), which should be an indicator of the durability. A less substantial relation is the decrease in strength with this ratio.

Figure 4:
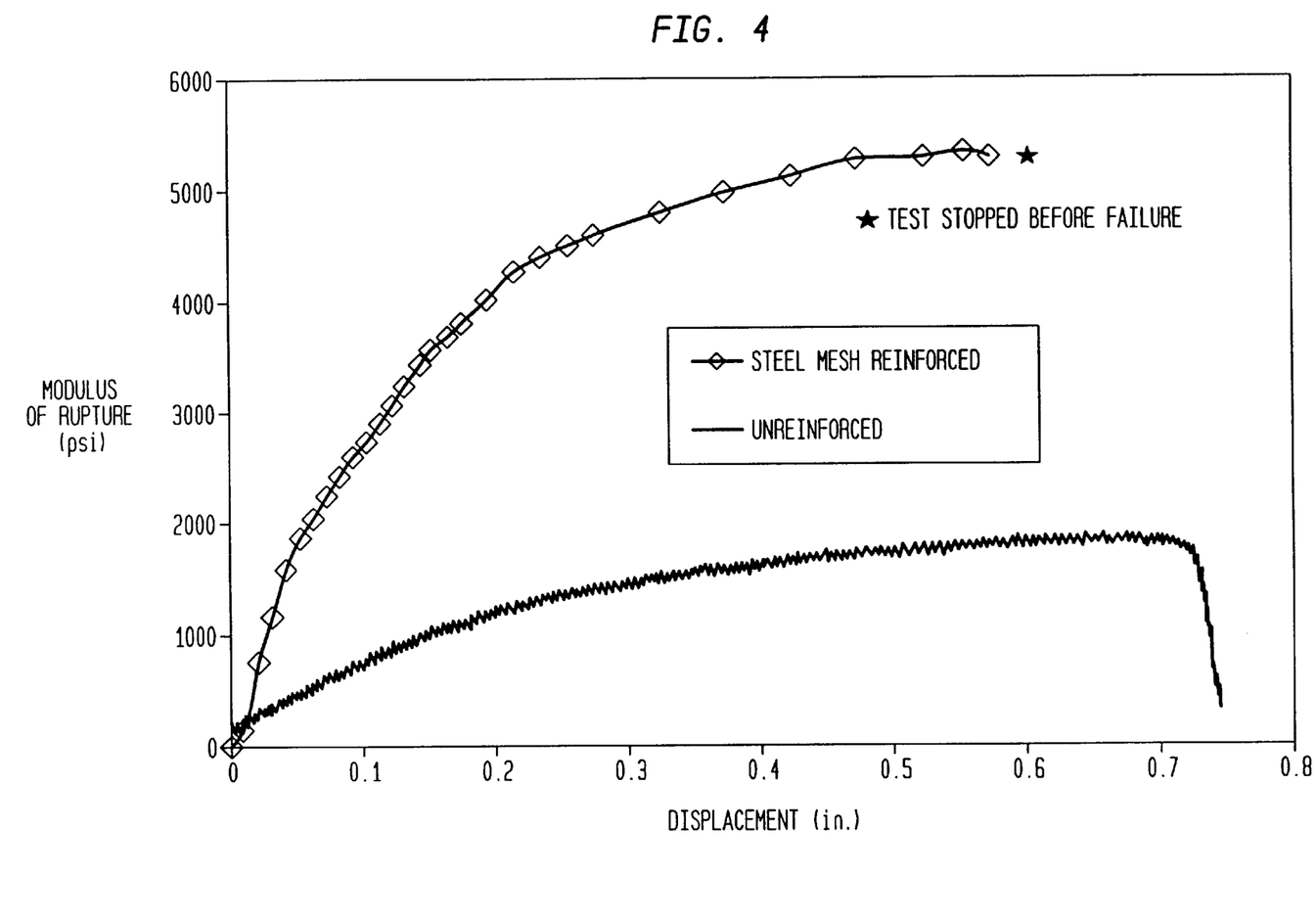
FIG. 4 is a graphical representation of the increase in flexural strength (psi) of a steel mesh-reinforced polymer-cement composite in accordance with the invention as a function of displacement (in.).

Structural reinforcement, with steel cloth, mesh, or rod, can be employed to improve the strength. Initial tests using hardware cloth produced more than a doubling in strength and a ten-fold increase in deflection, using a relatively brittle polymer-cement material. FIG. 4 shows preliminary data for a steel mesh-reinforced sample in which the composite strength was tripled. Adhesion of the material to the steel was excellent. In practice the use of a flexible material with good adhesion should eliminate any problems due to thermal expansion mismatch. Coupled with low porosity and a nearly neutral pH (due to reactive silica additions), the reinforced polymer-cement composite is expect to have a high level of corrosion-resistance of the steel in the composite.

Although the invention has been described in terms of specific embodiments and applications, persons skilled in the art can, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A polymer-cement composite comprising, by weight percent, about:
    40% to 50% inert, inorganic filler material;
    12% to 23% latex including polymer solids;
    20% to 25% cement, the ratio of polymer solids in the latex to cement (ls/c) being between 0.3 and 0.6;
    7% to 13% reactive silica;
    optional additives; and
    water.

2. The polymer-cement composite of claim 1 wherein water is present in an amount of 0% to 5% by weight.

3. The polymer-cement composite of claim 1 wherein all solid components have particle sizes less than 300 microns.

4. The polymer-cement composite of claim 1 wherein the reactive silica is a pozzolanic material.

5. The polymer-cement composite of claim 1 wherein the inert, inorganic filler material is selected from the group consisting of silica sand, ground nepheline syenite, ground sandstone, ground limestone, ground dolomite, coarse fly ash, and ground basalt.

6. The polymer-cement composite of claim 5 wherein the inert, inorganic filler is silica sand.

7. The polymer-cement composite of claim 6 wherein the silica sand has a particle size ranging from about 50 to 300 microns.

8. The polymer-cement composite of claim 1 wherein the inert, inorganic filler is a lightweight, fine aggregate material.

9. The polymer-cement composite of claim 8 wherein the lightweight, fine aggregate material is selected from the group consisting of fly ash, perlite, and vermiculite.

10. The polymer-cement composite of claim 1 wherein the polymer solids in the latex are redispersible.

11. The polymer-cement composite of claim 1 wherein the polymer solids in the latex are in an aqueous suspension.

12. The polymer-cement composite of claim 11 wherein the latex is a colloidal suspension of polymer solids in water containing about 50 percent by weight of spherical polymer particles ranging in size from about 0.01 micron to 1 micron in diameter.

13. The polymer-cement composite of claim 12 wherein the colloidal suspension comprises about 56–58 percent by weight polymer solids.

14. The polymer-cement composite of claim 1 wherein the polymer solids of the latex are selected from the group consisting of elastomeric polymers; thermoplastic polymers; and alkali-swellable latexes.

15. The polymer-cement composite of claim 14 wherein the latex is an aqueous suspension of polyacrylate polymer.

16. The polymer-cement composite of claim 14 wherein the latex is an aqueous suspension of styrene-butadiene polymer.

17. The polymer-cement composite of claim 14 wherein the latex is an aqueous suspension of styrene-acrylate polymer.

18. The polymer-cement composite of claim 1 wherein the cement is an hydraulic cement.

19. The polymer-cement composite of claim 18 wherein the hydraulic cement is selected from the group consisting of portland cement and calcium aluminate cements.

20. The polymer-cement composite of claim 19 wherein the hydraulic cement is portland cement having a particle size range from about 1 to 100 microns, with median particle sizes in the 10 to 15 micron range.

21. The polymer-cement composite of claim 1 wherein the reactive silica is selected from the group consisting of ground silica, silica fume (microsilica), precipitated silica, fly ash, and ground blast furnace slag or mixtures thereof.

22. The polymer-cement composite of claim 21 wherein the reactive silica has an average particle size range from about 0.01 to 45 microns.

23. The polymer-cement composite of claim 1 wherein the components are present in the following ratios:

|   | Components | Ratio |
|---|---|---|
| 1 | water/cement | 0.43–0.49 by weight |
| 2 | water/(cement + reactive silica) | 0.30–0.34 by weight |
| 3 | latex solids/cement (ls/c) | 0.30–0.60 by weight |
| 4 | filler/cement | 1.90–2.10 by weight |
| 5 | reactive silica/cement | 0.28–0.61 by weight |
| 6 | calcia/total reactive silica | 0.80–1.30 by moles. |

24. The polymer-cement composite of claim 1 wherein the optional additives are selected from the group consisting of pigments and admixtures.

25. The polymer-cement composite of claim 24 wherein the admixture is an organic, water-soluble polymer useful for plasticizing.

26. The polymer-cement composite of claim 25 wherein the admixture is selected from the group consisting of salts of sulphonated napthalene formaldehyde polymers and salts of sulphonated melamine formaldehyde polymers.

27. The polymer-cement composite of claim 1 further comprising reinforcing means.

28. The polymer-cement composite of claim 27 wherein the reinforcing means are selected from the group consisting of discrete or continuous fibers and steel cloth, mesh, or rods.

29. A polymer-cement composite comprising:
    silica sand;
    latex including polymer solids;
    portland cement, the ratio of polymer solids in the latex to cement (ls/c) being between 0.3 and 0.6;
    a mixture of ground silica and precipitated silica;
    water; and
    optionally, additives.

30. The polymer-cement composite of claim 29 comprising:

|   | Material | Avg. Particle Size | Range of Addition |
|---|---|---|---|
| 1 | Silica Sand | 130 $\mu$m | 41–48 wt % |
| 2 | Latex: Suspension | — | 13–22 wt % |
|   | (Solids) | 0.2 $\mu$m | (7–13 wt %) |
| 3 | Portland Cement | 10–15 $\mu$m | 20–25 wt % |
| 4 | Ground Silica | 3.7 $\mu$m | 5–12 wt % |
| 5 | Precipitated Silica | 0.015 $\mu$m | 1–2 wt % |
| 6 | Pigments | 0.1–1.0 $\mu$m | 0–1 wt % |
| 7 | Admixtures | — | 0–2 wt % |
| 8 | Water | — | 0–5 wt %. |

31. The polymer-cement composite of claim 30 wherein the components are present in the following ratios:

| | Components | Ratio |
|---|---|---|
| 1 | water/cement | 0.43–0.49 by weight |
| 2 | water/(cement + reactive silica) | 0.30–0.34 by weight |
| 3 | latex solids/cement (ls/c) | 0.30–0.60 by weight |
| 4 | sand/cement | 1.90–2.10 by weight |
| 5 | reactive silica/cement | 0.28–0.61 by weight |
| 6 | calcia/total reactive silica | 0.80–1.30 by moles. |

32. A method of making a polymer-cement composite comprising the steps of:
   (a) dry mixing the powdered components of a polymer-cement composite having the following composition, by weight percent:
      40% to 50% inert, inorganic filler material;
      12% to 23% latex including polymer solids
      20% to 25% cement, the ratio of polymer solids in the latex to cement (ls/c) being between 0.3 and 0.6;
      7% to 13% reactive silica;
      optional additives; and
      water;
   (b) adding the liquid components;
   (c) wet mixing of the powdered and liquid components to form a green body;
   (d) forming the green body into the desired shape of a product;
   (e) curing the product; and
   (f) drying the product.

33. A method of making a polymer-cement composite comprising the steps of:
   (a) dry mixing in a high intensity mixer, until homogeneous, the powdered components of a polymer-cement composite having the following composition, by weight percent:
      40% to 50% inert, inorganic filler material;
      12% to 23% a latex including polymer solids
      20% to 25% cement, the ratio of polymer solids in the latex to cement (ls/c) being between 0.3 and 0.6;
      7% to 13% reactive silica;
      optional additives; and
      water;
   (b) adding the liquid components under vacuum; and
   (c) wet mixing the powdered and liquid components at medium intensity to form a thoroughly mixed batch of green body which is subsequently de-aired.

34. The method of claim 33 comprising the further step(s) of:
   (d) forming the mixed batch into the desired shape of a product.

35. The method of claim 34 wherein the step of forming the mixed batch into the desired shape is selected from the group consisting of any of the following methods: extruding, molding, pressing, vibratory casting, and centrifugal casting.

36. The method of claim 34 wherein the step of forming the mixed batch into the desired shape comprises:
   vacuum extruding flat sheets from the mixed batch;
   cutting the extruded sheets to the desired size;
   placing the sheets into molds;
   pressing the sheets in the molds to shape; and
   de-molding the product.

37. The method of claim 34 including the further step of:
   curing the product.

38. The method of claim 37 wherein the step of curing is conducted in a moist environment.

39. The method of claim 38 wherein the step of curing in a moist environment comprises:
   curing in high pressure, saturated steam in an autoclave.

40. The method of claim 39 wherein the step of curing in an autoclave comprises slowly heating the product at a maximum rate of about 60° C. to 80° C. per hour to a temperature in the range of about 125° to 180° C. for about 2 to 12 hours.

41. The method of claim 38 wherein the step of curing in a moist environment comprises:
   warm, moist curing.

42. The method of claim 41 wherein step of warm, moist curing comprises curing in a moist environment having a relative humidity ranging from about 85% to 95% at a temperature of about 45° C. to 55° C. for about 6 to 14 days.

43. The method of claim 37 comprising the further step of, prior to curing, pre-curing at a room temperature in a moist environment having from about 85% to 95% relative humidity for up to 1 day.

44. The method of claim 37 comprising the further step of drying the product.

45. The method of claim 44 wherein the step of drying comprises the steps of:
   heating the product to about 85° C. at a rate of about 15° C. per hour and holding the product at temperature for about 16 to 24 hours; and
   final drying the product by increasing the temperature to about 105° C., at a rate of about 15° C. per hour, and holding the product at temperature for about 24 hours.

46. The polymer-cement composite of claim 21 wherein the reactive silica is a mixture of precipitated silica and ground silica.

47. The polymer-cement composite of claim 2 wherein the cement to water ratio is between 0.43 and 0.49.

* * * * *